(12) United States Patent
Feng et al.

(10) Patent No.: US 12,414,171 B2
(45) Date of Patent: *Sep. 9, 2025

(54) METHODS AND SYSTEMS FOR LINKING MOBILE APPLICATIONS TO MULTI-ACCESS POINT PROVIDERS TO PROVIDE SECURE COMMUNICATION OF ENCRYPTED USER DATA

(71) Applicant: Capital One Services, LLC, McLean, VA (US)

(72) Inventors: Fan Feng, Jersey City, NJ (US); Johanna Davis, Philadelphia, PA (US); Allison Fenichel, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 437 days.

This patent is subject to a terminal disclaimer.

(21) Appl. No.: 18/152,135

(22) Filed: Jan. 9, 2023

(65) Prior Publication Data

US 2024/0237088 A1    Jul. 11, 2024

(51) Int. Cl.
*H04W 76/11* (2018.01)
*H04W 12/06* (2021.01)

(52) U.S. Cl.
CPC ............ *H04W 76/11* (2018.02); *H04W 12/06* (2013.01)

(58) Field of Classification Search
CPC ..... H04W 76/11; H04W 76/12; H04W 12/06; H04W 12/062; H04W 12/065; H04W 12/02; H04L 63/0428; H04L 67/2804

USPC .......................................................... 370/329
See application file for complete search history.

(56) References Cited

U.S. PATENT DOCUMENTS

| | | | | |
|---|---|---|---|---|
| 8,306,829 | B2 * | 11/2012 | Starkey | G16H 50/50 |
| | | | | 705/322 |
| 8,996,607 | B1 * | 3/2015 | Bajaj | H04L 67/1006 |
| | | | | 709/217 |
| 9,306,829 | B1 * | 4/2016 | Boyle | H04L 65/765 |
| 10,728,807 | B1 * | 7/2020 | Kumar | H04W 12/73 |
| 11,372,832 | B1 * | 6/2022 | Reif | G06F 16/2246 |
| 11,395,209 | B2 * | 7/2022 | Boliek | H04W 40/22 |
| 2012/0116925 | A1 * | 5/2012 | Jamkhedkar | G06Q 20/382 |
| | | | | 726/30 |
| 2013/0159719 | A1 * | 6/2013 | Ha | G06F 21/51 |
| | | | | 713/176 |
| 2014/0173071 | A1 * | 6/2014 | Hazen | H04L 63/0876 |
| | | | | 709/223 |
| 2016/0358043 | A1 * | 12/2016 | Mu | G06V 30/194 |
| 2017/0288987 | A1 * | 10/2017 | Pasupathy | H04L 67/02 |
| 2017/0374551 | A1 * | 12/2017 | Shen | H04L 9/40 |
| 2021/0136587 | A1 * | 5/2021 | Ren | H04L 9/32 |

(Continued)

*Primary Examiner* — Jean A Gelin
(74) *Attorney, Agent, or Firm* — Foley & Lardner LLP

(57) ABSTRACT

Methods and systems are described herein for adapting legacy infrastructure to account for cybersecurity, privacy, and digital integrity issues plaguing electronic communications. In particular, the methods and systems overcome these issues by generate alternative content that is specific to specific destinations/recipients of electronic communications, as well as unique between each different destination/recipient. This unique alternative content may then be used for each access point (e.g., website, mobile application, etc.) linked to the same destination/recipient (e.g., website and/or mobile application provider).

20 Claims, 5 Drawing Sheets

(56) References Cited

U.S. PATENT DOCUMENTS

2023/0308874 A1* 9/2023 Yang .................. H04W 12/04
2024/0121618 A1* 4/2024 Saloni ............... H04W 72/0453

* cited by examiner

METHODS AND SYSTEMS FOR LINKING MOBILE APPLICATIONS TO MULTI-ACCESS POINT PROVIDERS TO PROVIDE SECURE COMMUNICATION OF ENCRYPTED USER DATA

BACKGROUND

In recent years, the amount of content and the number of functions available that are performed through electronic communications has increased exponentially. Moreover, users are increasingly turning to electronic communications to perform functions previously done through physical interactions. While the increase in use of electronic communications has had the beneficial effect of opening new avenues for interactions and increasing the ease at which users can interact, electronic communications have also had the effect of opening new mechanisms for fraud and theft. This is particularly true for electronic communications performed using legacy infrastructure that was not designed for electronic communications. In many instances, these legacy systems and infrastructure were not designed to handle the cybersecurity, privacy, and digital integrity issues that have arisen with the use of electronic communications.

SUMMARY

Methods and systems are described herein for adapting legacy infrastructure to account for cybersecurity, privacy, and digital integrity issues plaguing electronic communications. In particular, the methods and systems overcome these issues by generating alternative content that is specific to specific destinations/recipients of electronic communications, as well as unique between each different destination/recipient. This unique alternative content may then be used for each access point (e.g., website, mobile application, etc.) linked to same destination/recipient (e.g., website and/or mobile application provider).

As an example, the methods and systems provide secure communications of user data that is specific to a specific destination (e.g., a given website, entity, and/or access point linked to a common provider). The methods and systems accomplish this by generating a provider-specific token (e.g., an access point identifier) for the destination. This unique access point identifier is then used to provide alternative content that is specific to the provider, irrespective of which access point (e.g., website, mobile application, etc.) is used to transmit the communication to the provider. Not only does this ensure that whichever access point is used, the same alternative content is provided, but it also increases security because even if the alternative content is accessed by an unauthorized party, the unauthorized party has no mechanism for using the alternative content.

However, this novel approach is not without its own technical challenges. For example, in many instances, a designated destination (e.g., a provider) may have multiple access points for receiving user information such as multiple websites or mobile applications, each of which may have multiple versions or formats. If each access point were treated as an individual destination, the electronic communication would have an unacceptably high failure rate as the system would interpret each website, application, etc., as corresponding to a different provider and generate different alternative content. Accordingly, the system requires a mechanism to link multiple access points to a given provider and do so in consistent fashion. At the same time, the system needs to ensure that each provider is associated with a unique identifier, otherwise the wrong alternative content could be used.

To meet this technical challenge, the system maintains a record of access points (e.g., website addresses, mobile applications, etc.) that correspond to a specific designated destination. Upon receiving an electronic communication, the system determines a designated destination that corresponds to an access point of the electronic communication. However, this determination involves its own technical challenges. Specifically, while some access points (e.g., websites) provide information (e.g., that is readily determinable based on root address information) indicating whether an access point is associated with a designated destination, other types of access points (e.g., mobile applications) do not. This is even more difficult, as metadata for mobile applications is not standardized and may include multiple references with various contexts (e.g., a developer of a mobile application may be independent of, and not associated with, the designated destination) as well as internal links to other designated destinations (e.g., social media platforms, cloud service providers, etc.), which are unformatted and contextually barren.

In order to process this unformatted and contextually barren data, the system applies a normalization protocol. The system then determines an access point identifier for the first access point based on hashing the normalized metadata. By hashing the normalized metadata, the system has ensured that the access point identifier is unique to the provider. Furthermore, by first normalizing the metadata, the system has ensured that the provider only has one access point identifier. Notably, the normalization protocol may include both hashing operations and preprocessing operations performed on native data. For example, as opposed to conventional encryption, which may apply a hashing function to native data, the system may first perform a preprocessing step to ensure that the native data is in a standardized format (e.g., removing lowercase values, removing spaces, etc.). Conventionally, hashing would not include this feature as the hashing itself deals with the lack of standardization (e.g., the resulting hashed format is itself standardized). However, as the system compares the results of the hashed data (e.g., access point identifier that comprise hashed values), the system must ensure that each access point and/or provider receives the same access point identifier. A slight variation in native data (e.g., due to the aforementioned lack of standardization) may cause the hash to generate a different hashed value that may be completely unrecognizable and/or untraceable to other hashed values for the access point and/or provider.

In some aspects, the methods and systems describe linking mobile applications to multi-access point providers to provide secure communication of user data encrypted specifically for a given multi-access point provider. For example, the system may receive a first dataset from a local hashing application implemented on a mobile device, wherein the first dataset comprises a first access point address and is generated based on a request, by a first access point, for first user information of a user for use by a first provider, wherein the first provider provides the first access point. The system may retrieve metadata from the first access point. The system may normalize, using a first normalization protocol, the metadata to generate normalized metadata. The system may determine a first access point identifier for the first access point based on hashing the normalized metadata. The system may compare the first access point identifier to a plurality of access point identifiers, wherein each of the plurality of access point identifiers corresponds to a previous provider of the user. The system may determine, based on comparing the first access point identifier to the plurality of access point identifiers, that the first access point identifier corresponds to the first provider.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention. It should also be noted that the methods and systems disclosed herein are also suitable for applications unrelated to mobile applications.

Figure 1:
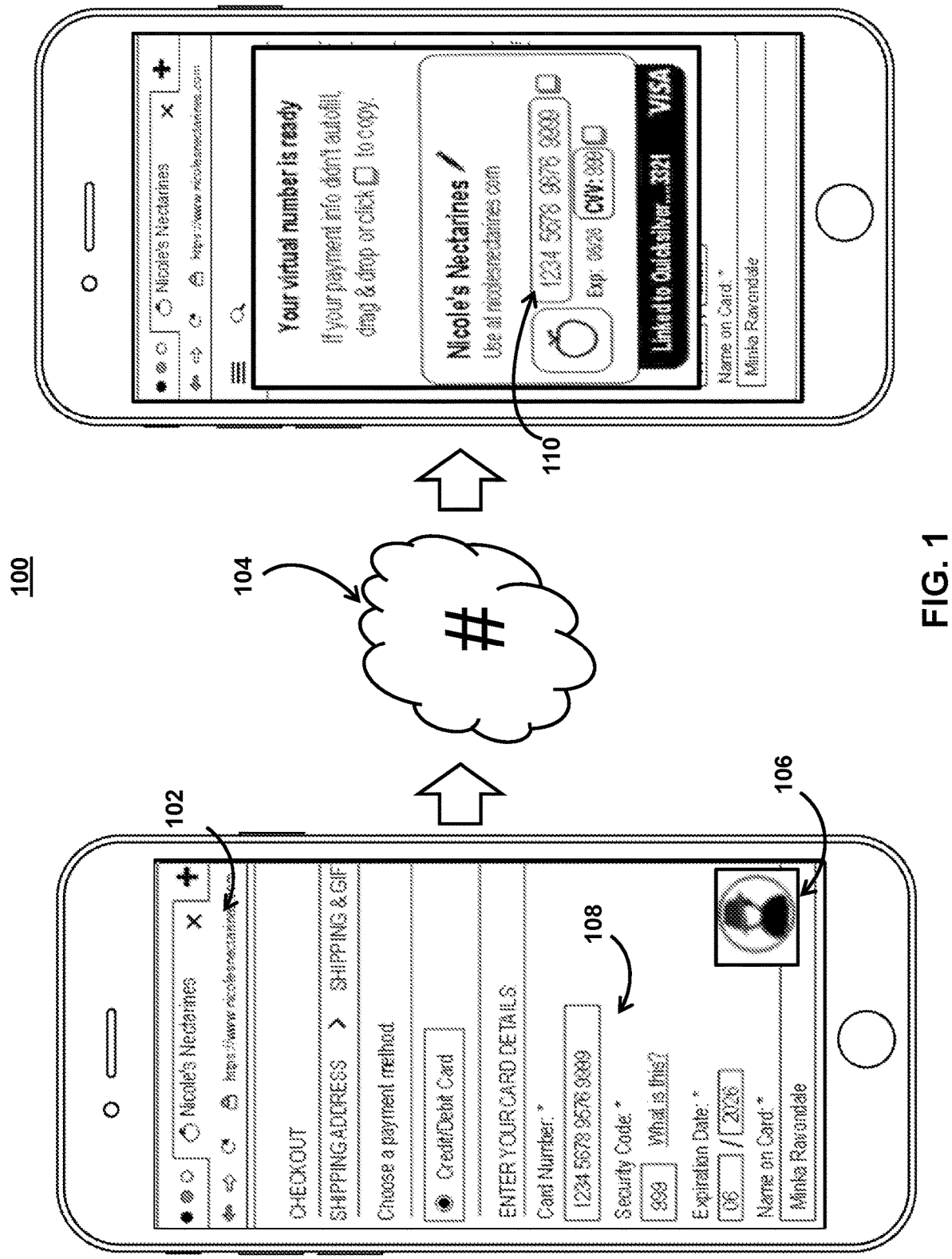
FIG. 1 shows an illustrative example of a local hashing application generating an icon for requesting alternative content, in accordance with one or more embodiments.

FIG. 1 shows an illustrative example of a local hashing application generating an icon for requesting alternative content, in accordance with one or more embodiments. For example, user interface 100 includes application 102 and application 104. The system may provide a mechanism for linking application 102 to a third-party provider of access points. That is, the system (e.g., application 104) may link mobile applications (e.g., application 102) to website providers (or other access point providers) using a database that is populated based on mobile application metadata (e.g., metadata for application 102 that is determined by application 104) in order to provide secure communication of user data (e.g., credit card information) encrypted specifically for given website providers. Application 104 may comprise a local hashing application.

As referred to herein, a "local hashing application" may comprise an application that is running concurrently with, and/or in the background of, another application. The local hashing application may comprise a plug-in or another software component that adds features to an existing computer program. For example, a local hashing application may comprise an application that has no directly visible user interface. Once deployed and configured, these applications launch at machine startup and run continuously without any process lifetime management resource use limitations. If they crash or exit, the system may automatically restart them.

In some embodiments, the local hashing application may perform operations related to generating alternative content (e.g., determine a virtual card number for use). The local hashing application may perform this using one or more locally stored components. Additionally, or alternatively, the local hashing application may perform this using one or more remotely stored components and/or transmitting requests for remotely stored information.

In some embodiments, the local hashing application may perform one or more hashing algorithms. The hashing algorithms may perform one or more hashing operations. Hashing comprises a process of transforming a given key or a string of characters into another value. The other value may comprise a shorter, fixed-length value or key that represents and makes it easier to find or employ the original string. For example, hashing algorithms may comprise mathematical functions that convert data into fixed-length hash values, hash codes, and/or hashes.

For example, the system may determine a first access point identifier for the first access point based on hashing the normalized metadata. Hashing the normalized data gives a more secure and adjustable method of retrieving data compared to other data structures (e.g., it is quicker than searching for lists and arrays).

For example, a local hashing application (e.g., application 104), implemented on a mobile device (e.g., a user device comprising user interface 100), may comprise a plug-in extension for encrypting sensitive user data (e.g., generating virtual credit card numbers). The local hashing application may respond to detected requests, by a mobile application (e.g., application 102), for the sensitive user data (e.g., credit card information) for use by a mobile application provider (e.g., a merchant) for the second mobile application implemented on the mobile device. As referred to herein, a "user interface" maycomprise a mechanism for human-computer interaction and communication on a device and may include input devices, display screens, keyboards, a mouse, and the appearance of a desktop.

In response to detecting the request, the system (e.g., application 104) may query a database, implemented on the remote server, and/or a local datastore on a user device, for alternative content. As referred to herein, "alternative content" includes any content that replaces original, native, or other content about a user. In some embodiments, the alternative content may comprise a virtual card number. It should be noted that "content" should be understood to mean an electronically consumable user asset, representations of goods or services (including nonfungible tokens), Internet content (e.g., streaming content, downloadable content, webcasts, etc.), video data, audio data, image data, and/or textual data, etc., as well as personal or sensitive (e.g., non-public) user data, including financial user data.

For example, the system may receive a first dataset from the local hashing application and/or plug-in extension, in which the first dataset comprises a mobile application address. For example, the first dataset may comprise a user request to purchase an item from the first access point address. The user request may comprise both a selection of an item and payment information such as a credit card. An access point address may comprise any address (e.g., electronic address, account address, URL, etc.) that indicates a location of an access point.

As referred to herein, an "access point" maycomprise any interface (whether electronic or otherwise) through which a user may interact with a provider, receive datasets, and/or transmit datasets. For example, an access point may comprise a website, a call center, a mobile application, a brick-and-mortar store, etc. Access points may further be defined as electronic (e.g., websites, mobile apps, etc.) and non-electronic (e.g., brick-and-mortar stores).

The first dataset may be generated based on a request, by the second mobile application, for first user information for use by the mobile application provider, wherein the mobile application provider provides the second mobile application. The second mobile application may comprise an access point. The first user information may comprise information such as personally identifiable information (PII), which may include any representation of information that permits the identity of an individual to whom the information applies to be reasonably inferred by either direct or indirect means. Additionally, or alternatively, the first user information may include private or sensitive user data, such as a credit card number. In some embodiments, the first dataset may be generated in response to a user selection of an icon (e.g., icon 106) requesting alternative content.

The provider (e.g., the provider of the access point) may comprise a merchant or other entity. For example, a provider may comprise any entity that provides a good or service. Additionally or alternatively, the provider may provide access points through which users may communicate with the provider regarding those goods or services.

The system may determine an access point identifier (e.g., a mobile application identifier) for the second mobile application based on metadata retrieved from the second mobile application by the first mobile application, wherein the metadata indicates an email domain name for a developer of the second mobile application. For example, an access point identifier may comprise any identifier used to identify the provider of the access point and/or distinguish the provider of the access point from other providers of access points. For example, in one illustrative embodiment, a user may be browsing a website and be ready to check out (e.g., purchase items on the website). The system may comprise a plug-in for a web browser that automatically does a database lookup (e.g., on the database) using a host URL (e.g., the website URL). In response to the database lookup, the system may retrieve a hash value for that website or brand (e.g., an access point identifier).

The system may compare the access point identifier to a plurality of access point identifiers, wherein each of the plurality of access point identifiers corresponds to a previously used provider of the user (e.g., a provider that already has an associated access point identifier). For example, each access point identifier may correspond to access points for a given merchant (e.g., websites, mobile applications, store accounts, etc.), and the system may create the access point identifier each time a new merchant is detected.

The system may determine, based on comparing the access point identifier to the plurality of access point identifiers, that the access point identifier corresponds to a first provider. For example, the system may determine that the second mobile application provider is a merchant that already has corresponding alternative content (e.g., a virtual card number). The system may then determine alternative content (e.g., virtual card number 110) for the first provider, wherein the alternative content is a first unique token that is specific to the mobile application provider, and wherein the alternative content satisfies the request. For example, the alternative content may comprise a virtual card number. The virtual card number may comprise a unique token that the user may use for transactions with the first provider. Notably, the token is only authorized (e.g., by a provider of the database) for transactions with the first provider. Accordingly, even if an unauthorized party obtains the alternative content, the unauthorized party may not use it to conduct other transactions. For example, the system may replace a known user data 108 (e.g., a user's credit card number) with the alternative content (e.g., virtual card number 110).

In response to determining the alternative content for the first provider, the system may generate a second dataset, wherein the second dataset comprises the first alternative content, and transmit the second dataset to the local hashing application, wherein the local hashing application responds to the request by sending the alternative content to the mobile application address.

In some embodiments, the system may generate one or more local hashing application overlays. As referred to herein, a "local hashing application overlay" maycomprise a screen overlay generated by a local hashing application (e.g., an application running concurrently with another application and/or in the background of the other application). A screen overlay allows an application to display content over another application running on a device and/or using an operating system. Each local hashing application may be specific to a given operating system and may generate the screen overlay using permission specific to the device and/or operating system. For example, in some operating systems, a screen overlay is generated using a "SYSTEM_ALERT_WINDOW" permission. For example, the permission allows an application to display content on the screen of the device in response to a triggering event.

In some embodiments, a triggering event for the local hashing application overlay may be the detection of a third-party application (e.g., application 102) for which alternative content may be provided by the local hashing application. For example, the system (e.g., the local hashing application) may determine that a currently displayed third-party application (or currently displayed fields of the third-party application) may be automatically populated by the local hashing application. For example, the system may detect that the third-party application corresponds to a third party for which the local hashing application may provide alternative content (e.g., a virtual account number). In response, the system may generate an icon (e.g., icon 106) on user interface 100. Icon 106 may indicate that alternative content and/or auto-population of provider-specific data is available.

In some embodiments, a triggering event for the local hashing application overlay may be the launching of the local hashing application and/or the powering on of a device upon which the local hashing application is implemented. For example, icon 106 may appear automatically upon a user powering on the device, launching the local hashing application, and/or launching another application. The system may then wait for a user input (e.g., selecting icon 106). Upon receiving the user input, the system (e.g., the local hashing application) may determine the currently displayed third-party application (or currently displayed fields of the third-party application) and may attempt to automatically populate information for the third-party application. For example, the system may detect that the third-party application corresponds to a third party for which the local hashing application may provide alternative content (e.g., a virtual account number). In response, the system may transmit a request for the alternative content. Alternatively, or additionally, the system may collect information about the third-party application and/or a currently displayed field and transmit that information to a remote source. The remote source may then determine whether alternative content may be automatically populated. For example, the remote source may identify the third-party application and determine alternative content for the application.

The system may detect metadata about an access point in order to determine whether the access point corresponds to a given provider. In some embodiments, the system may detect one or more features or characteristics in the metadata for application 102, application 104, or a device generating user interface 100. As described herein, a feature may include any visual characteristic, option, and/or functional capability provided to a user by software and/or hardware, including software code. For example, a feature may include a distinctive attribute or aspect of the software and/or hardware such as how data is displayed, where data is displayed, what type of data is displayed, what functions are available, etc., as well as evidence of a developer of the software. For example, in some embodiments, a feature may be an available function of an application, operating system, and/or device. In some embodiments, the feature may be provided as part of an application and/or may be provided as a plug-in, applet, browser extension, and/or other software component for an existing application. For example, the feature may be part of an application and/or other program that may be toggled on or off. In another example, the feature may be a software component that may be added and/or removed from an application.

In some embodiments, the feature may be a conceptual data model of the application and/or one or more fields of the application (e.g., the fields currently displayed by the application). For example, the conceptual data model may be a representation of data objects, the associations between different data objects, and/or the rules of the application. In some embodiments, the system may determine a visual representation of the data and apply consistent naming conventions, default values, and semantics to one or more fields in the model. These naming conventions, default values, and semantics of the one or more fields in the model may then be used by the system to generate an access point identifier for the application. The system may use the access point identifier to identify the application. For example, the system may compare the access point identifier to a database, for example, a lookup table database listing access point identifiers and the entity (e.g., developers, sources, content provider, app provider, etc.) corresponding to each, to identify the entity corresponding to the application.

Each application may display particular information and/or information of a particular type. Alternatively, or additionally, each application may provide a given function. This function may be a locally performed function (e.g., a function performed on a local device) or this function may be a remotely executed function. In some embodiments, the application may include a link to additional information and/or other applications, which may be accessed and/or available locally or remotely. In some embodiments, the application may be represented by textual and/or graphical information. For example, an application may comprise a purchasing function through which a user may enter information (e.g., user credential and/or payment account information) that when transmitted may cause a purchase to occur. The system may identify these characteristics and application features for use in generating the conceptual data model.

In some embodiments, the system may detect information about a feature of an application (e.g., metadata or other information that describes the feature). For example, the information may describe a purpose, function, origin, creator, developer, system requirement (including required formats and/or capabilities), author, recommended use, and/or approved user. The information may be expressed in a human and/or computer-readable language or may not be perceivable to a user viewing user interface 100.

The information may also include a reference or pointer to user profile information that may be relevant to the selection and/or use of the feature. The system may retrieve this information and/or compare it to the description in order to verify, select, and/or use the feature. For example, the description may indicate that the feature uses a particular format or relates to a particular user, user device, and/or user account.

The system may access a user profile. The user profile may be stored locally on a user device (e.g., user device 322 (FIG. 3)) and/or on a remote source (e.g., a component of system 300 (FIG. 3)). The user profile may include information about a user and/or a device of a user. The information may be generated by actively and/or passively monitoring actions of the user. The user profile may also include information aggregated from one or more sources (including third-party sources). The information in the user profile may include personally identifiable information about a user and may be stored in a secure and/or encrypted manner. The information in the user profile may include information about user settings and/or preferences of the user, activity of the user, demographics of the user, and/or any other information used to target a feature toward a user and/or customize features for a user.

In some embodiments, the system may pre-fetch alternative content as a user navigates and/or uses one or more applications. The system may pre-fetch this information based on information in the user profile (e.g., a user preference or setting), a predetermined or standard application feature selection (e.g., by the application), a feature that was previously selected when the application was last used, and/or other criteria. For example, the system may continuously, and in real time, pre-fetch (or request) alternative content for automatically populating provider-specific information. The system may continuously pre-fetch this information and/or may push this information to a local user device and/or edge server for immediate use if an application is activated. Accordingly, the system may minimize delays attributed to populating provider-specific data and attributed to processing time needed by a remote source.

Icon 106 may include a first link. For example, the link may include a hyperlink. For example, the link may include a link from a hypertext file or document to another location or file, typically activated by clicking on a highlighted word or image on the screen. The link may be an inline link that displays remote content without the need for embedding the content. For example, the inline link may display a modified version of accessible content (e.g., an image, a thumbnail, a low-resolution preview, a cropped section, or a magnified section of the accessible content). Alternatively or additionally, the link may be an anchor link and/or a fat link. In some embodiments, the first link may comprise a push notification. For example, the push notification may have been generated in real time based on a determination by the system (e.g., by machine learning model 302 (FIG. 3)) that provider-specific data may be needed. In response to a user selection of icon 106 in user interface 100, the system may transmit a request to a remote source (e.g., web server 310 (FIG. 3)). Alternatively, or additionally, the system may generate a new icon or an icon with additional information as shown in FIG. 2.

Figure 2:
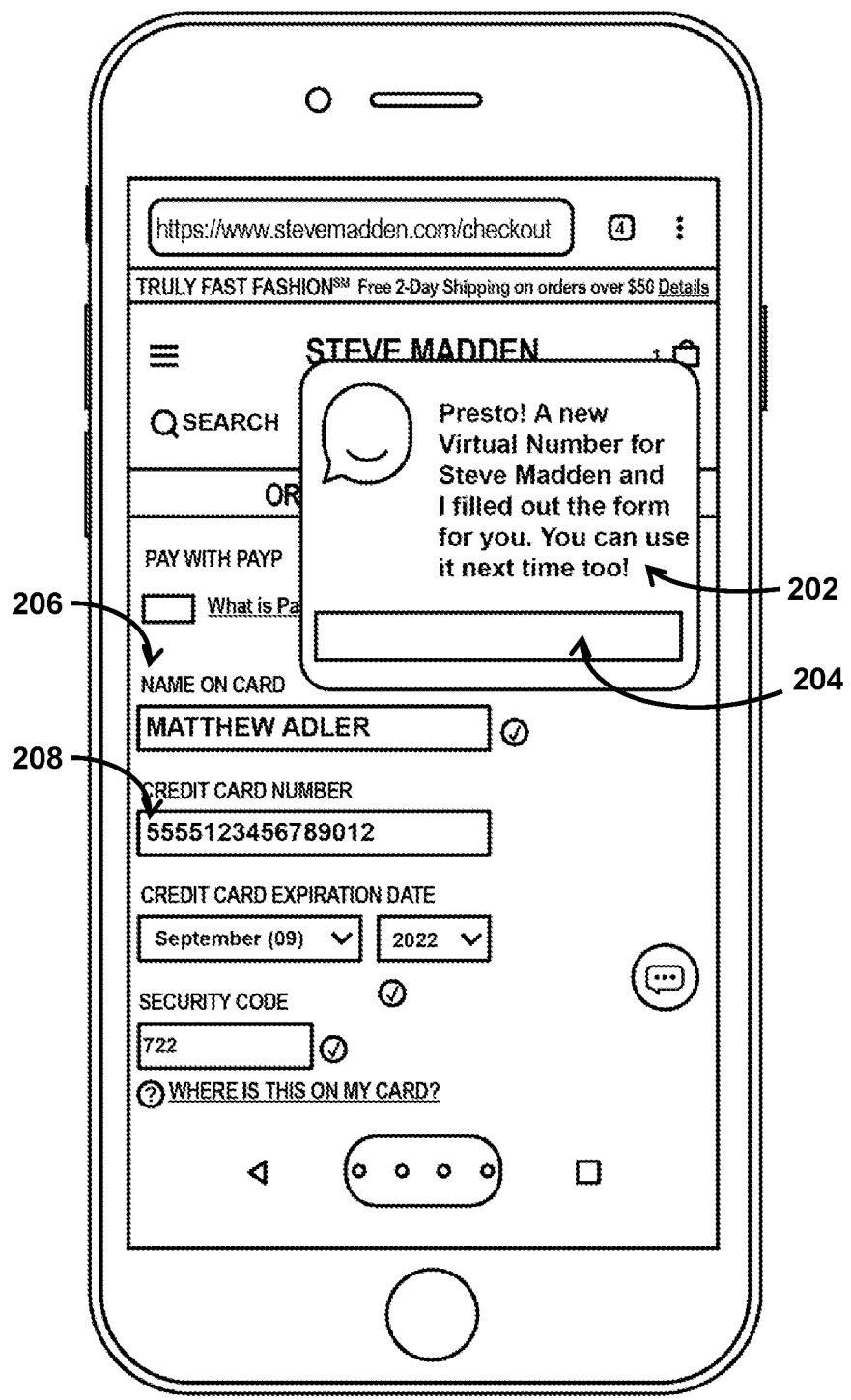
FIG. 2 shows an illustrative example of a local hashing application overlay generating a prompt for automatically populating provider-specific information, in accordance with one or more embodiments.

FIG. 2 shows an illustrative example of a local hashing application overlay generating a prompt for automatically populating provider-specific information, in accordance with one or more embodiments. For example, user interface 200 may include icon 202 (which may have replaced icon 106 (FIG. 1)). Icon 202 may include user prompts for initialing a request (e.g., user prompt 204). For example, a local hashing application implemented on a mobile device may receive a request, by a first access point, for first user information for use by a first provider, wherein the first provider provides the first access point, and wherein the first access point comprises a website.

In response to a selection of user prompt 204, the system may generate a request for provider-specific data (e.g., to populate fields 206 and/or 208). Alternatively, or additionally, in response to a user selection of user prompt 204, the system may identify an application shown in user interface 200 and determine whether a field (e.g., field 206 and/or 208) currently displayed in the user interface corresponds to a predetermined field that is automatically populated by the first application. For example, the system may retrieve metadata used to determine a type of field and compare the type to a predetermined type of field that is automatically populated by a local hashing application. In response to determining that the field corresponds to a predetermined field, the system may transmit, to a remote source (e.g., web server 310 (FIG. 3)) and/or retrieve from local data, a request for alternative content for populating the field.

For example, the system may parse, in response to the request, the first access point to generate a first dataset, wherein the first dataset comprises a plurality of predetermined metadata fields at the first access point, and wherein the plurality of predetermined metadata fields comprises a first access point address, and wherein the first access point address comprises a universal resource locater for the website.

The request may comprise an API request (or call) from one application (e.g., a local hashing application implemented on a local device) to an application on a server (e.g., a server implementing web server 310 (FIG. 3)). The request may include one or more types of information that may be used by the web server to respond to the request. For example, the request may include information used to select provider-specific data, identify an application, and/or determine a field for populating. This information may comprise a first dataset.

The system may then retrieve metadata from the first dataset. The system may then normalize, using a normalization protocol, the metadata to generate normalized metadata. As referred to herein, a "normalization protocol" maycomprise a protocol transforming any element of an equivalence class (e.g., an access point of a provider) into a representation specific to the class (e.g., the provider). For example, the normalization protocol may determine a text string in the metadata, detect a space character in the text string, and remove the space character. Additionally, or alternatively, the normalization protocol may determine a text string in the metadata, detect an uppercase character in the text string, and substitute the uppercase character with an equivalent lowercase character.

xxIn some embodiments, the system may use a normalization protocol on retrieved metadata to generate normalized metadata. The normalization protocol may perform a preprocessing step to standardize native data in the metadata, wherein the preprocessing step comprises determining a text string in the metadata, detecting a space character in the text string, and removing the space character. The normalization protocol may also determine a first access point identifier for the first access point based on hashing the normalized metadata.

For example, in some embodiments, the local hashing application overlay may create a library to simplify communicating using API requests and managing user, application, and session data. The system may therefore support multiple data providers and federated routing development, including better management of application/sub-application routing, consistent capture of data, and/or identification of fields. For example, a third-party application may have a field called "paymenttype," and the system may have data for populating payment type information in a record labeled "payTP." Using the library, the API request may normalize the format in the request.

After determining the normalized metadata that is common across all access points, the system may determine an access point identifier for the first access point based on hashing the normalized metadata. For example, the system may use a hashing algorithm, which may be a cryptographic hash function that maps data of arbitrary size to a hash of a fixed size. Notably, the hashing algorithm will create a unique access point identifier for the provider with respect to all other providers. Additionally, the access point identifier for the provider will be the same irrespective of which of the access points for the provider was included in the dataset (e.g., due to the normalization).

The system may then compare the access point identifier to a plurality of access point identifiers, wherein each of the plurality of access point identifiers corresponds to a previous provider of a user. The system may then determine, based on comparing the first access point identifier to the plurality of access point identifiers, that the first access point identifier corresponds to the first provider.

Figure 3:
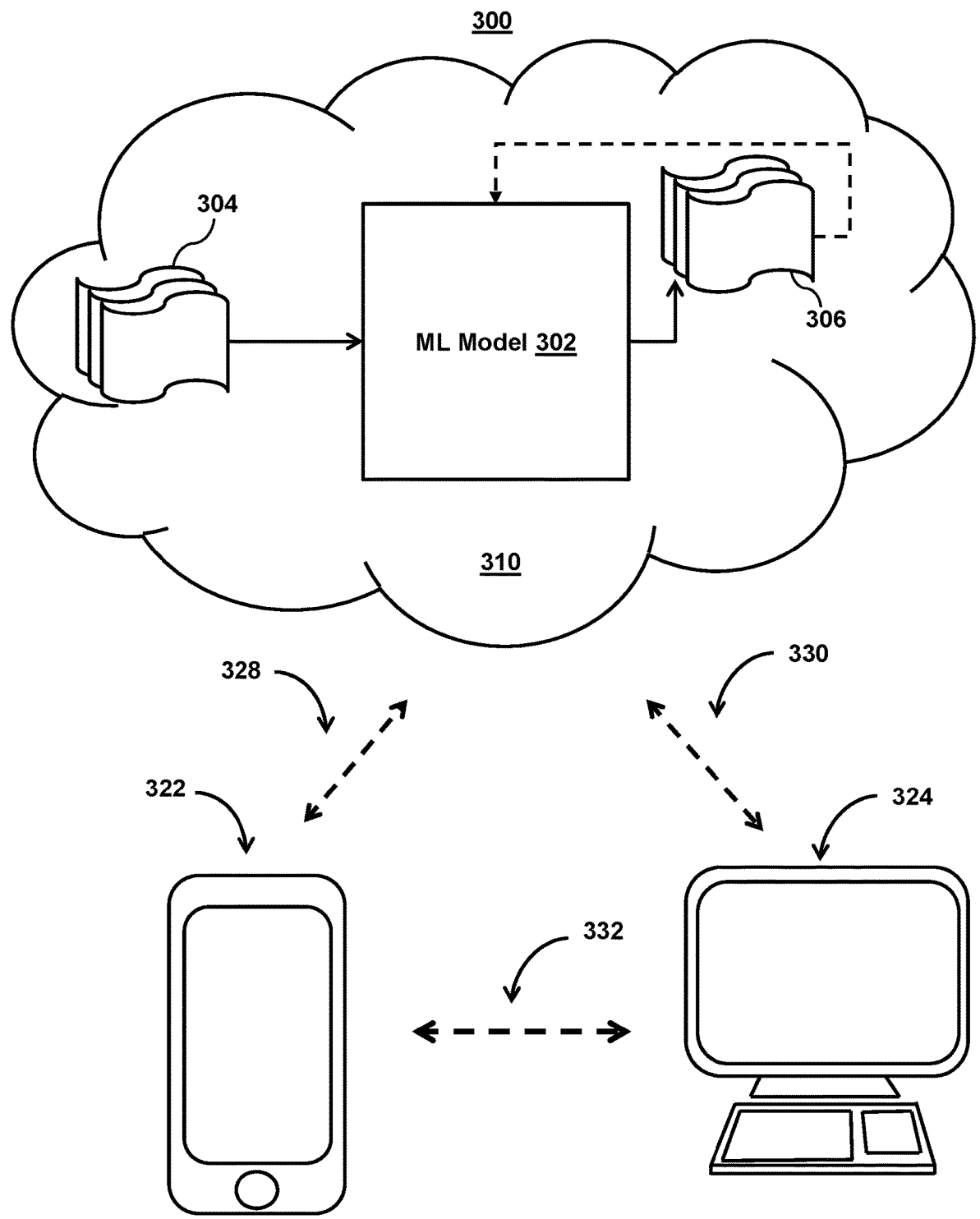
FIG. 3 shows an illustrative system for populating provider-specific information using local hashing applications, in accordance with one or more embodiments.

FIG. 3 shows an illustrative system for populating provider-specific information using local hashing applications, in accordance with one or more embodiments. As shown in FIG. 3, system 300 may include user device 322, user device 324, and/or other components. Each user device may include any type of mobile terminal, fixed terminal, or other device. For example, each of these devices may comprise one or more of the devices shown in FIG. 1. Each of these devices may receive content and data via input/output (I/O) paths and may also include processors and/or control circuitry to send and receive commands, requests, and other suitable data using the I/O paths. The control circuitry may comprise any suitable processing circuitry. Each of these devices may also include a user input interface and/or display for use in receiving and displaying data (e.g., user interface 100 (FIG. 1)).

By way of example, user device 322 and user device 324 may include a desktop computer, a server, or other client device. Users may for instance, utilize one or more of the user devices to interact with one another, one or more servers, or other components of system 300. It should be noted that, while one or more operations are described herein as being performed by particular components of system 300, those operations may in some embodiments, be performed by other components of system 300. As an example, while one or more operations are described herein as being performed by components of user device 322, those operations may in some embodiments, be performed by components of user device 324. System 300 also includes machine learning model 302, which may be implemented on user device 322 and user device 324 or accessible by communication path 328 and communication path 330, respectively. It should be noted that, although some embodiments are described herein with respect to machine learning models, other prediction models (e.g., statistical models or other analytics models) may be used in lieu of, or in addition to, machine learning models in other embodiments (e.g., a statistical model replacing a machine learning model and a non-statistical model replacing a non-machine learning model in one or more embodiments).

Each of these devices may also include memory in the form of electronic storage. The electronic storage may include non-transitory storage media that electronically stores information. The electronic storage of media may include (i) system storage that is provided integrally (e.g., substantially non-removable) with servers or client devices, and/or (ii) removable storage that is removably connectable to the servers or client devices via, for example, a port (e.g., a USB port, a firewire port, etc.) or a drive (e.g., a disk drive, etc.). The electronic storage may include optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 4G or LTE network), a cable network, a public switched telephone network, or other types of communications network or combinations of communications networks. Communication paths 328, 330, and 332 may include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As an example, with respect to FIG. 3, machine learning model 302 may take inputs 304 and provide outputs 306. The inputs may include multiple data sets, such as a training data set and a test data set. In some embodiments, outputs 306 may be fed back to machine learning model 302 as input to train machine learning model 302 (e.g., alone or in conjunction with user indications of the accuracy of outputs 306, labels associated with the inputs, or other reference feedback information). In another embodiment, machine learning model 302 may update its configurations (e.g., weights, biases, or other parameters) based on the assessment of its prediction (e.g., outputs 306) and reference feedback information (e.g., user indication of accuracy, reference labels, or other information). In another embodiment, where machine learning model 302 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may for example, be reflective of the magnitude of error propagated backward after a forward pass has been completed. In this way, for example, the machine learning model 302 may be trained to generate better predictions (e.g., whether or not two access points, providers, accounts, etc., are linked).

In some embodiments, machine learning model 302 may include an artificial neural network. In such embodiments, machine learning model 302 may include an input layer and one or more hidden layers. Each neural unit of machine learning model 302 may be connected with many other neural units of machine learning model 302. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function that the signal must surpass before it propagates to other neural units. Machine learning model 302 may be self-learning and trained, rather than explicitly programmed, and can perform significantly better in certain areas of problem solving, as compared to traditional computer programs. During training, an output layer of machine learning model 302 may correspond to a classification of machine learning model 302 and an input known to correspond to that classification may be input into an input layer of machine learning model 302 during training. During testing, an input without a known classification may be input into the input layer, and a determined classification may be output.

In some embodiments, machine learning model 302 may include multiple layers (e.g., where a signal path traverses from front layers to back layers). In some embodiments, backpropagation techniques may be utilized by machine learning model 302 where forward stimulation is used to reset weights on the "front" neural units. In some embodiments, stimulation and inhibition for machine learning model 302 may be more free-flowing, with connections interacting in a more chaotic and complex fashion. During testing, an output layer of machine learning model 302 may indicate whether a given input corresponds to a classification of machine learning model 302. Machine learning model 302 may be used for populating provider-specific information using local hashing applications or for determining whether an application corresponds to a current version of an application.

Figure 4:
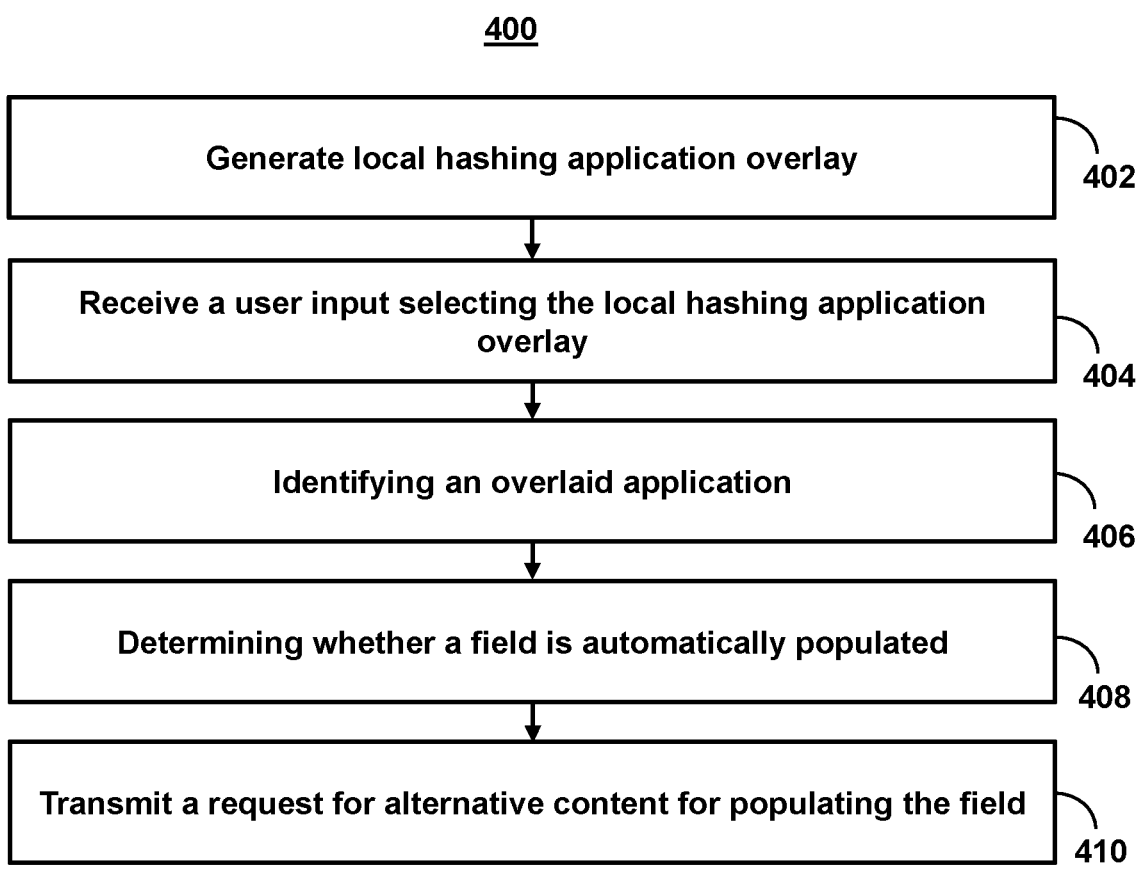
FIG. 4 shows a flowchart of the steps involved in populating provider-specific information using local hashing applications, in accordance with one or more embodiments.

FIG. 4 shows a flowchart of the steps involved in populating provider-specific information using local hashing applications, in accordance with one or more embodiments. For example, process 400 provides one embodiment of how to populate provider-specific information using local hashing applications, in accordance with one or more embodiments.

At step 402, process 400 generates (e.g., via one or more components of FIGS. 1-3) for display a local hashing application overlay. For example, the system may generate for display, on a mobile device, a local hashing application overlay corresponding to a first application, wherein the local hashing application overlay overlays a user interface generated by a second application. For example, the system may generate a local hashing application overlay (e.g., icon 106 (FIG. 1)) that overlays one or more applications (e.g., application 102 (FIG. 1)).

In some embodiments, the system may generate for display a selectable icon corresponding to the local hashing application overlay over the user interface. For example, as shown in FIGS. 1-2, the system may comprise one or more icons that allow the user to manually request alternative content that is provider-specific to be automatically populated in the application. For example, the system may determine that the application being displayed includes one or more payment fields that require payment information (e.g., a credit card, address, etc.). The system may in response to this determination (or the launching and/or display of the application itself) generate the overlay.

In some embodiments, the system may determine a native overlay for an operating system for the mobile device. The system may then determine a display position for the native overlay and select a position for a selectable icon based on the display position. For example, the system may retrieve the native overlay settings for the operating system and/or current configuration of the device. The system may then place the local hashing application overlay (e.g., icon 106 (FIG. 1)) in a location on the user interface (e.g., user interface 100 (FIG. 1)) that does not conflict with a position or location in the native overlay. Accordingly, the system ensures that a user does not select the local hashing application unintentionally and/or the icon does not interfere with the native overlay of the device or operating system.

At step 404, process 400 receives (e.g., via one or more components of FIGS. 1-3) a user input selecting the local hashing application overlay. For example, the system may receive a user input selecting the local hashing application overlay while the user interface is displayed. In some embodiments, the system may automatically generate a request based on the selection. Alternatively or additionally, the system may generate an additional icon that includes additional information and/or prompts (e.g., icon 202 (FIG. 2)).

At step 406, process 400 identifies (e.g., via one or more components of FIGS. 1-3) an overlaid application. For example, the system may identify the second application in response to the user input. For example, the local hashing application may identify the second application (e.g., an application currently displayed on a user interface, such as application 102 on user interface 100 (FIG. 1)) in response to a user selection of the local hashing application (e.g., icon 106 (FIG. 1)).

In some embodiments, identifying the second application may comprise determining an access point identifier for the second application and comparing the access point identifier to a database to identify the second application. For example, the system may store (e.g., at web server 310 (FIG. 3)) a lookup table database of access point identifiers for all applications (or applications for which alternative content is available). For example, the system may determine whether a virtual account number is available for the target application. If so, the system may retrieve the virtual account number and populate the application (or a field of the application) with the virtual account number.

In some embodiments, identifying the second application may comprise determining an access point identifier for the second application and comparing the access point identifier to a database to identify an entity (e.g., provider) corresponding to the second application. The system may then query an entity for a current identification number for the second application, receive the current identification number for the second application from the entity, and compare the access point identifier to the current identification number.

In some embodiments, identifying the second application may comprise determining a mapping of the second application and comparing the mapping to an application mapping database to identify an entity corresponding to the second application. For example, as opposed to retrieving an access point identifier, the system may retrieve a mapping of the fields currently displayed. The system may use this mapping, as well as other metadata and other information, to identify the application. For example, as opposed to retrieving an access point identifier, which may be unauthorized, the local hashing application may identify the application based on a mapping and/or other data (e.g., a conceptual data model). Accordingly, the system may identify fraudulent applications and/or out-of-date versions of the application, even if the application has a legitimate access point identifier.

At step 408, process 400 determines (e.g., via one or more components of FIGS. 1-3) whether a field is automatically populated. For example, the system may determine whether a field currently displayed in the user interface corresponds to a predetermined field that is automatically populated by the first application in response to the user input. For example, the system may have a predetermined type and/or number of fields that may be populated (e.g., fields related to a virtual account number assigned by the local hashing application provider to the application). The system may determine which fields, if any, correspond to one of these predetermined fields.

In some embodiments, determining whether the field currently displayed in the user interface corresponds to the predetermined field that is automatically populated by the first application may further comprise determining a conceptual data model for the second application, wherein the conceptual data model includes semantic information and determining the field based on the conceptual data model. For example, the system may determine the type and/or function of each field and the purpose for which values entered into the field are used. For example, in response to determining that the conceptual data model for the second application indicates that a field is related to transactions, the system may retrieve virtual account number information for that field.

At step 410, process 400 transmits (e.g., via one or more components of FIGS. 1-3) a request for alternative content for populating the field. For example, the system may in response to determining that the field corresponds to a predetermined field, transmit, to a remote source, a request for alternative content for populating the field, wherein the alternative content is selected from available alternative content based on the second application and the field. For example, the system may transmit an API request that includes the identification of the application (or information used to identify the application) to a remote source (e.g., web server 310 (FIG. 3)).

For example, the alternative content may be a virtual account number for a financial service provider. Additionally, or alternatively, the virtual account number may correspond to an entity corresponding to the second application.

For example, the virtual account number may be a unique credit card number that allows the application to transact on the user's main credit card account without using—or exposing—the main credit card account number to the application. The issuer of the virtual account number may allow the user to lock or delete a particular virtual account number (e.g., due to fraudulent activity) and generate a new virtual account number, without affecting the status of the main credit card account.

In some embodiments, the system may receive, from the remote source, the alternative content. The alternative content may in some embodiments, be a virtual account number for the user associated with the target application. In some embodiments, the virtual account number may have been uniquely generated for a particular transaction. The number may be linked to the transaction based on transaction details (e.g., price, date, time, etc.) and only used for that particular transaction.

In some embodiments, the system may populate the field in the second application with the alternative content. The system may further populate the field while the values are obscured from a user (e.g., the virtual account number may not be perceivable by the user) in order to enhance security and prevent unauthorized users from observing the virtual account number in the user interface.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
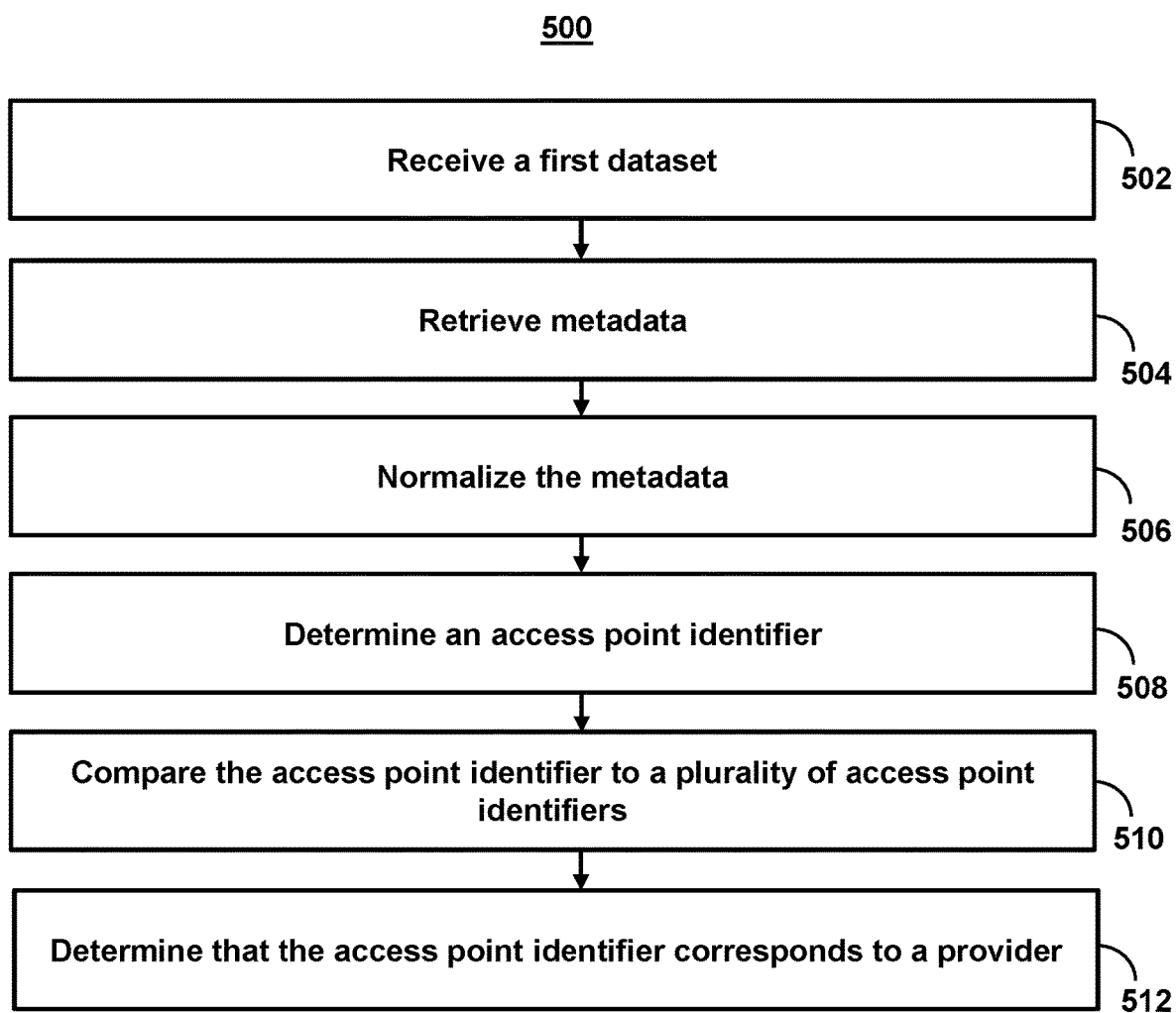
FIG. 5 shows a flowchart of the steps involved in determining whether an application corresponds to a current version of an application, in accordance with one or more embodiments.

FIG. 5 shows a flowchart of the steps involved in linking mobile applications to multi-access point providers to provide secure communication of user data encrypted specifically for a given multi-access point provider, in accordance with one or more embodiments.

At step 502, process 500 receives (e.g., via one or more components of FIGS. 1-3) a first dataset. For example, the system may receive a first dataset from a local hashing application implemented on a mobile device, wherein the first dataset comprises a first access point address and is generated based on a request, by a first access point, for first user information for use by a first provider, wherein the first provider provides the first access point.

At step 504, process 500 retrieves (e.g., via one or more components of FIGS. 1-3) metadata. For example, the system may retrieve metadata from the first access point. In some embodiments, retrieving the metadata from the first access point may comprise the system retrieving data from a plurality of predetermined metadata fields at the first access point and parsing the data to generate the metadata.

In some embodiments, retrieving metadata may further comprise the system retrieving data from a plurality of predetermined metadata fields at the first access point and parsing the data to generate the metadata. For example, in some access point types, URL information may not be available. Furthermore, other information, which is standardized in other types of access point types, such as "owner" or "developer," is not standardized in all access point types. For example, metadata for a mobile application may have various relationship information, which may include a programmer or developer that is different from a provider (e.g., merchant) corresponding to the actual application. Because scraping metadata may retrieve this information and thus may subsequently incorrectly indicate that an app developer is a provider, the system uses a ranking system to determine whether scraped data indicates a likely provider. The system may use several fields that may include strings in the package name, domain names, title and/or description field, and/or developer name.

In some embodiments, retrieving metadata may further comprise the system retrieving data and performing additional preprocessing in order to filter out data that may inaccurately identify a provider. For example, the system may determine that the number of reviews of the first access point exceeds the threshold number, and, in response to determining that the number of reviews of the first access point exceeds the threshold number, retrieve additional data corresponding to a provider of the first access point. For example, if a mobile application has a certain number of reviews or a certain rating, the mobile application is likely to be an authorized mobile application. Therefore, the system may retrieve additional information from the metadata that indicates the provider. Notably, the system may only perform this determination if the threshold is met. If not, the system may determine that any provider information in the metadata may not be correct, may be outdated, and/or may have been unauthorized.

In some embodiments, retrieving metadata may further comprise retrieving data corresponding to a developer email domain name and comparing the developer email domain name to a provider name to determine the first access point identifier. For example, as opposed to other data in the metadata retrieved from the first access point, if a developer email corresponds to a known provider, the provider is likely to be associated with the access point.

In some embodiments, retrieving metadata may further comprise: retrieving data corresponding to a last date of a third-party review for the first access point; comparing the last date to a threshold date; determining that the last date is after the threshold number; and in response to determining that the last date is after the threshold number, retrieving additional data corresponding to a provider of the first access point. For example, if a mobile application has a recent review, the system may more reliably indicate that this is a current version of a mobile application. Therefore, the system may retrieve additional information from the metadata that indicates the provider. Notably, the system may only perform this determination if the threshold is met. If not, the system may determine that any provider information in the metadata may not be correct, may be outdated, and/or may have been unauthorized.

In some embodiments, retrieving metadata may further comprise retrieving data corresponding to a last date of a third-party review for the first access point, comparing the last date to a threshold date, determining that the last date is after the threshold date, and in response to determining that the last date is after the threshold date, retrieving additional data corresponding to a provider of the first access point. Additionally, or alternatively, the system may determine a first unique identifier used to locate the first access point on the Internet and generate a first hash value based on the first unique identifier.

At step 506, process 500 normalizes (e.g., via one or more components of FIGS. 1-3) the metadata. For example, the system may normalize, using a first normalization protocol, the metadata to generate normalized metadata. By hashing the normalized metadata, the system has ensured that the access point identifier is unique to the provider. Furthermore, by first normalizing the metadata, the system has ensured that the provider only has one access point identifier.

In some embodiments, normalizing the metadata to generate the normalized metadata may comprise modifying one or more characteristics of the metadata. For example, the system may apply one or more rules to modify a character in a text string. For example, the system may determine a text string in the metadata. The system may then detect a space character in the text string, and the system may remove the space character. Additionally, or alternatively, the system may determine a text string in the metadata, detect an uppercase character in the text string, and substitute the uppercase character with a lowercase character. Additionally, or alternatively, the system may apply a normalization that comprises generating one or more hashes (e.g., prior to hashing the normalized metadata in step 508). For example, the first normalization protocol may comprise a module that returns a hash value for an inputted object.

In some embodiments, determining the first access point identifier for the first access point based on hashing the normalized metadata comprises the system inputting the normalized metadata into a hashing algorithm and generating a first hash value based on the normalized metadata.

At step 508, process 500 determines (e.g., via one or more components of FIGS. 1-3) an access point identifier. For example, the system may determine a first access point identifier for the first access point based on metadata retrieved from the first access point. More specifically, the system may determine the first access point identifier for the first access point based on hashing the normalized metadata.

In some embodiments, determining the access point identifier for the first access point comprises determining a first unique identifier used to locate the first access point on the Internet and generating a first hash value based on the first unique identifier. For example, the system may use an access point identifier to determine whether a provider is already associated with alternative content for the user. For example, the system may perform a database lookup with a hash value (e.g., a hash value of a URL of the access point). The system may then determine whether the hash value corresponds to existing hash values for the first user information (e.g., an existing credit card number). If a match is found, the existing alternative content (e.g., a virtual card number) is returned. Otherwise, the system may create a new token (e.g., new alternative content for use with the provider).

At step 510, process 500 compares (e.g., via one or more components of FIGS. 1-3) the access point identifier to a plurality of access point identifiers. For example, the system may compare the first access point identifier to a plurality of access point identifiers of access point identifiers, wherein each of the plurality of access point identifiers corresponds to a previous provider of the user. In some embodiments, the system may compare the first access point identifier to a plurality of access point identifiers of access point identifiers at a database, wherein each of the plurality of access point identifiers corresponds to a previous provider of the user. In some embodiments, comparing the first access point identifier to the plurality of access point identifiers of access point identifiers that correspond to the user may comprise the system retrieving the first hash value and comparing the first hash value to existing hash values in a hash table corresponding to the first user information. Additionally, or alternatively, comparing the first hash value to the existing hash values in the hash table corresponding to the first user information may comprise the system retrieving a user profile corresponding to the mobile device and retrieving the hash table from the user profile.

In some embodiments, comparing the first access point identifier to the plurality of access point identifiers that correspond to the user further comprises retrieving the first hash value and comparing the first hash value to existing hash values in the intermediary hash table corresponding to the first user information. For example, the system may store the URL hash (e.g., the unique identifier) generated for the first access point with the newly created token details in the user's token vault (e.g., a portion of the database corresponding to the user) so that it can be retrieved later. As such, in the database, a URL (e.g., corresponding to an access point) is assigned to a provider based on a unique hashed URL ID.

At step 512, process 500 determines (e.g., via one or more components of FIGS. 1-3) that the access point identifier corresponds to a provider. For example, the system may determine, based on comparing the first access point identifier to the plurality of access point identifiers, that the first access point identifier corresponds to the first provider. In some embodiments, the system may determine, based on comparing a second access point identifier to the plurality of access point identifiers, that the second access point identifier does not correspond to any access point identifier of the plurality of access point identifiers. In response to determining that the second access point identifier does not correspond to any access point identifier of the plurality of access point identifiers, the system may generate second alternative content based on the second access point identifier.

In some embodiments, process 500 determines (e.g., via one or more components of FIGS. 1-3) alternative content. For example, the system may determine first alternative content for the first provider, wherein the first alternative content is a first unique token that is specific to the first provider.

In some embodiments, determining the first alternative content for the first provider further comprises inputting the first access point identifier into a database comprising available alternative content and receiving an output of the first alternative content. For example, as opposed to determining alternative content based directly on each access point identifier, the system first determines whether a provider already has existing alternative content. For example, the system first determines whether each access point identifier matches an access point identifier already labeled with a provider. If so, the system retrieves alternative content matching that provider. By doing so, the system ensures that only one set of alternative content is used for any access point associated with a provider.

In some embodiments, the system may generate additional data. For example, process 500 may generate (e.g., via one or more components of FIGS. 1-3) a second dataset. For example, the system may in response to determining the first alternative content for the first provider, generate a second dataset, wherein the second dataset comprises the first alternative content. Process 500 may then transmit (e.g., via one or more components of FIGS. 1-3) the second dataset. For example, the system may transmit the second dataset to the local hashing application, wherein the local hashing application responds to the request using the first alternative content.

In some embodiments, the system may determine, based on comparing a second access point identifier to the plurality of access point identifiers, that the second access point identifier does not correspond to any access point identifier of the plurality of access point identifiers. In response to determining that the second access point identifier does not correspond to any access point identifier of the plurality of access point identifiers, the system may generate second alternative content based on the second access point identifier. For example, instead of retrieving alternative content (e.g., a virtual card number) based on an access point identifier, the system first defaults to retrieval using a first provider identifier where available. By doing so, the system ensures that the same alternative content is returned for websites and applications provided by the same provider. If alternative content is not available for a provider (e.g., as indicated by the lack of alternative content previously generated for a provider identifier), the system will generate alternative content based on the access point identifier and/or create a new provider identifier.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-3 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for linking mobile applications to multi-access point providers to provide secure communication of user data encrypted specifically for a given multi-access point provider.

2. The method of any one of the preceding embodiments, comprising: receiving a first dataset from a local hashing application implemented on a mobile device, wherein the first dataset comprises a first access point address and is generated based on a request, by a first access point, for first user information of a user for use by a first provider, wherein the first provider provides the first access point; retrieving metadata from the first access point; normalizing, using a first normalization protocol, the metadata to generate normalized metadata; determining a first access point identifier for the first access point based on hashing the normalized metadata; comparing the first access point identifier to a plurality of access point identifiers, wherein each of the plurality of access point identifiers corresponds to a previous provider of the user; and determining, based on comparing the first access point identifier to the plurality of access point identifiers, that the first access point identifier corresponds to the first provider.

3. The method of any one of the preceding embodiments, further comprising: determining first alternative content for the first provider, wherein the first alternative content is a first unique token that is specific to the first provider; and in response to determining the first alternative content for the first provider, generating a second dataset, wherein the second dataset comprises the first alternative content.

4. The method of any one of the preceding embodiments, wherein determining the first alternative content for the first provider further comprises: inputting the first access point identifier into a database comprising available alternative content; and receiving an output of the first alternative content.

5. The method of any one of the preceding embodiments, wherein determining the first access point identifier for the first access point based on hashing the normalized metadata further comprises: inputting the normalized metadata into a hashing algorithm; and generating a first hash value based on the normalized metadata.

6. The method of any one of the preceding embodiments, wherein comparing the first access point identifier to the plurality of access point identifiers of access point identifiers that correspond to the user further comprises: retrieving the first hash value; and comparing the first hash value to existing hash values in a hash table corresponding to the first user information.

7. The method of any one of the preceding embodiments, wherein comparing the first hash value to the existing hash values in the hash table corresponding to the first user information further comprises: retrieving a user profile corresponding to the mobile device and retrieving the hash table from the user profile.

8. The method of any one of the preceding embodiments, further comprising: determining, based on comparing a second access point identifier to the plurality of access point identifiers, that the second access point identifier does not correspond to any access point identifier of the plurality of access point identifiers; and in response to determining that the second access point identifier does not correspond to any access point identifier of the plurality of access point identifiers, generating second alternative content based on the second access point identifier.

9. The method of any one of the preceding embodiments, wherein retrieving the metadata from the first access point further comprises: retrieving data from a plurality of predetermined metadata fields at the first access point and parsing the data to generate the metadata.

10. The method of any one of the preceding embodiments, wherein normalizing the metadata to generate the normalized metadata further comprises: determining a text string in the metadata; detecting a space character in the text string; and removing the space character.

11. The method of any one of the preceding embodiments, wherein normalizing the metadata to generate the normalized metadata further comprises: determining a text string in the metadata; detecting an uppercase character in the text string; and substituting the uppercase character with a lowercase character.

12. The method of any one of the preceding embodiments, wherein the first normalization protocol comprises a module that returns a hash value for an inputted object.

13. The method of any one of the preceding embodiments, wherein determining the first access point identifier for the first access point further comprises: retrieving data corresponding to a last date of a third-party review for the first access point; comparing the last date to a threshold date; determining that the last date is after the threshold date; and in response to determining that the last date is after the threshold date, retrieving additional data corresponding to a provider of the first access point.

14. The method of any one of the preceding embodiments, wherein determining the first access point identifier for the first access point comprises: determining a first unique identifier used to locate the first access point on the Internet; and generating a first hash value based on the first unique identifier.

15. A tangible, non-transitory, machine-readable medium storing instructions that, when executed by a data processing apparatus, cause the data processing apparatus to perform operations comprising those of any of embodiments 1-14.

16. A system comprising: one or more processors and memory storing instructions that, when executed by the processors, cause the processors to effectuate operations comprising those of any of embodiments 1-14.

17. A system comprising means for performing any of embodiments 1-14.

What is claimed is:

1. A system for linking mobile applications to website providers to provide secure communication of user data encrypted specifically for given website providers, the system comprising:
    a mobile device, wherein the mobile device comprises one or more processors; and
    a local hashing application, implemented on the mobile device, which comprises instructions executed by the one or more processors causing operations comprising:
        receiving a request, by a first access point, for first user information for use by a first provider, wherein the first provider provides the first access point, and wherein the first access point comprises a website;
        parsing, in response to the request, the first access point to generate a first dataset, wherein the first dataset comprises a plurality of predetermined metadata fields at the first access point, and wherein the plurality of predetermined metadata fields comprises a first access point address, and wherein the first access point address comprises a universal resource locator for the website;
        retrieving metadata from the first dataset;
        normalizing, using a first normalization protocol, the metadata to generate normalized metadata, wherein the first normalization protocol:
            performs a preprocessing step to standardize native data in the metadata, wherein the preprocessing step comprises:
                determining a text string in the metadata;
                detecting a space character in the text string; and
                removing the space character; and
            determines a first access point identifier for the first access point based on hashing the normalized metadata;
        comparing the first access point identifier to a plurality of access point identifiers, wherein each of the plurality of access point identifiers corresponds to a previous provider of a user; and
        determining, based on comparing the first access point identifier to the plurality of access point identifiers, that the first access point identifier corresponds to the first provider.

2. A method for linking mobile applications to multi-access point providers to provide secure communication of user data encrypted specifically for a given multi-access point provider, the method comprising:
    receiving a first dataset from a local hashing application implemented on a mobile device, wherein the first dataset comprises a first access point address and is generated based on a request, by a first access point, for first user information of a user for use by a first provider, wherein the first provider provides the first access point;
    retrieving metadata from the first access point;
    normalizing, using a first normalization protocol, the metadata to generate normalized metadata;
    determining a first access point identifier for the first access point based on hashing the normalized metadata;
    comparing the first access point identifier to a plurality of access point identifiers, wherein each of the plurality of access point identifiers corresponds to a previous provider of the user; and
    determining, based on comparing the first access point identifier to the plurality of access point identifiers, that the first access point identifier corresponds to the first provider.

3. The method of claim 2, further comprising:
    determining first alternative content for the first provider, wherein the first alternative content is a first unique token that is specific to the first provider; and
    in response to determining that the first alternative content for the first provider, generating a second dataset, wherein the second dataset comprises the first alternative content.

4. The method of claim 3, wherein determining the first alternative content for the first provider further comprises:
    inputting the first access point identifier into a database comprising available alternative content; and
    receiving an output of the first alternative content.

5. The method of claim 2, wherein determining the first access point identifier for the first access point based on hashing the normalized metadata further comprises:
    inputting the normalized metadata into a hashing algorithm; and
    generating a first hash value based on the normalized metadata.

6. The method of claim 5, wherein comparing the first access point identifier to the plurality of access point identifiers of access point identifiers that correspond to the user further comprises:
    retrieving the first hash value; and
    comparing the first hash value to existing hash values in a hash table corresponding to the first user information.

7. The method of claim 6, wherein comparing the first hash value to the existing hash values in the hash table corresponding to the first user information further comprises:
    retrieving a user profile corresponding to the mobile device; and
    retrieving the hash table from the user profile.

8. The method of claim 2, further comprising:
    determining, based on comparing a second access point identifier to the plurality of access point identifiers, that the second access point identifier does not correspond to any access point identifier of the plurality of access point identifiers; and
    in response to determining that the second access point identifier does not correspond to any access point identifier of the plurality of access point identifiers, generating second alternative content based on the second access point identifier.

9. The method of claim 2, wherein retrieving the metadata from the first access point further comprises:
    retrieving data from a plurality of predetermined metadata fields at the first access point; and
    parsing the data to generate the metadata.

10. The method of claim 2, wherein normalizing the metadata to generate the normalized metadata further comprises:
- determining a text string in the metadata;
- detecting a space character in the text string; and
- removing the space character.

11. The method of claim 2, wherein normalizing the metadata to generate the normalized metadata further comprises:
- determining a text string in the metadata;
- detecting an uppercase character in the text string; and
- substituting the uppercase character with a lowercase character.

12. The method of claim 2, wherein the first normalization protocol comprises a module that modifies characters in a text string.

13. The method of claim 2, wherein determining the first access point identifier for the first access point further comprises:
- retrieving data corresponding to a last date of a third-party review for the first access point;
- comparing the last date to a threshold date;
- determining that the last date is after the threshold date; and
- in response to determining that the last date is after the threshold date, retrieving additional data corresponding to a provider of the first access point.

14. The method of claim 2, wherein determining the first access point identifier for the first access point comprises:
- determining a first unique identifier used to locate the first access point on the Internet; and
- generating a first hash value based on the first unique identifier.

15. A non-transitory, computer-readable medium comprising instructions that, when executed by one or more processors, cause operations comprising:
- receiving a first dataset from a local hashing application implemented on a mobile device, wherein the first dataset comprises a first access point address and is generated based on a request, by a first access point, for first user information of a user for use by a first provider, wherein the first provider provides the first access point;
- retrieving metadata from the first access point;
- normalizing, using a first normalization protocol, the metadata to generate normalized metadata;
- determining a first access point identifier for the first access point based on hashing the normalized metadata;
- comparing the first access point identifier to a plurality of access point identifiers, wherein each of the plurality of access point identifiers corresponds to a previous provider of the user;
- determining, based on comparing the first access point identifier to the plurality of access point identifiers, that the first access point identifier corresponds to the first provider;
- determining first alternative content for the first provider, wherein the first alternative content is a first unique token that is specific to the first provider; and
- in response to determining the first alternative content for the first provider, generating a second dataset, wherein the second dataset comprises the first alternative content.

16. The non-transitory, computer-readable medium of claim 15, wherein comparing the first access point identifier to the plurality of access point identifiers of access point identifiers that correspond to the user further comprises:
- retrieving a first hash value; and
- comparing the first hash value to existing hash values in a hash table corresponding to the first user information.

17. The non-transitory, computer-readable medium of claim 16, wherein determining the first alternative content for the first provider further comprises:
- inputting the first access point identifier into a database comprising available alternative content; and
- receiving an output of the first alternative content.

18. The non-transitory, computer-readable medium of claim 15, further comprising:
- determining, based on comparing a second access point identifier to the plurality of access point identifiers, that the second access point identifier does not correspond to any access point identifier of the plurality of access point identifiers; and
- in response to determining that the second access point identifier does not correspond to any access point identifier of the plurality of access point identifiers, generating second alternative content based on the second access point identifier.

19. The non-transitory, computer-readable medium of claim 15, wherein determining the first access point identifier for the first access point based on hashing the normalized metadata further comprises:
- retrieving data from a plurality of predetermined metadata fields at the first access point; and
- parsing the data to generate the metadata.

20. The non-transitory, computer-readable medium of claim 15, wherein determining the first access point identifier for the first access point based on hashing the normalized metadata further comprises:
- retrieving data corresponding to a developer email domain name; and
- comparing the developer email domain name to a provider name to determine the first access point identifier.

* * * * *